US012611850B2

(12) United States Patent
Lahtinen et al.

(10) Patent No.: US 12,611,850 B2
(45) Date of Patent: Apr. 28, 2026

(54) ORIENTED FILM CONTAINING RECYCLED POLYAMIDE

(71) Applicant: AMCOR FLEXIBLES NORTH AMERICA, INC., Neenah, WI (US)

(72) Inventors: Kimmo Lahtinen, Lempäälä (FI); Kalle Ilmari Nattinen, Tempere (FI)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 268 days.

(21) Appl. No.: 18/029,336

(22) PCT Filed: Oct. 30, 2020

(86) PCT No.: PCT/US2020/058271
§ 371 (c)(1),
(2) Date: Mar. 29, 2023

(87) PCT Pub. No.: WO2022/093269
PCT Pub. Date: May 5, 2022

(65) Prior Publication Data
US 2023/0364891 A1 Nov. 16, 2023

(51) Int. Cl.
*B32B 27/08* (2006.01)
*B32B 7/023* (2019.01)
(Continued)

(52) U.S. Cl.
CPC .............. *B32B 27/08* (2013.01); *B32B 7/023* (2019.01); *B32B 7/12* (2013.01); *B32B 27/18* (2013.01);
(Continued)

(58) Field of Classification Search
CPC ............ B32B 2250/03; B32B 2250/24; B32B 2270/00; B32B 2272/00; B32B 2307/406;
(Continued)

(56) References Cited

U.S. PATENT DOCUMENTS 3,546,044 A 12/1970 Cousin
4,647,509 A 3/1987 Wallace et al.
(Continued)

FOREIGN PATENT DOCUMENTS

EP 0622183 A2 11/1994
JP 2003251627 A 9/2003
(Continued)

OTHER PUBLICATIONS

PCT International Search Report, International Application No. PCT/US2020/058271, issued Jan. 7, 2021, 2 pages.
(Continued)

*Primary Examiner* — Lawrence D Ferguson

(57) ABSTRACT

A low odor packaging film is disclosed. The low odor packaging film comprises an oriented film. The oriented film includes a first odor barrier layer, a second barrier layer and an inner layer that comprises a multicomponent recyclate. The inner layer is present between the first odor barrier layer and the second odor barrier layer. The first and second odor barrier layers reduces the transmission of the odor or the odor causing components present in the multicomponent recyclate of the inner layer with a product or item packed with the low odor packaging film. The oriented film has a low haze value as compared to a non-oriented of the same composition and structure.

16 Claims, 4 Drawing Sheets

(51) Int. Cl.

| | |
|---|---|
| *B32B 7/12* | (2006.01) |
| *B32B 27/18* | (2006.01) |
| *B32B 27/30* | (2006.01) |
| *B32B 27/32* | (2006.01) |
| *B32B 27/34* | (2006.01) |
| *B65D 75/26* | (2006.01) |

(52) U.S. Cl.
CPC ............ *B32B 27/306* (2013.01); *B32B 27/32* (2013.01); *B32B 27/34* (2013.01); *B65D 75/26* (2013.01); *B32B 2250/24* (2013.01); *B32B 2270/00* (2013.01); *B32B 2272/00* (2013.01); *B32B 2307/406* (2013.01); *B32B 2307/414* (2013.01); *B32B 2307/516* (2013.01); *B32B 2307/7244* (2013.01); *B32B 2307/7248* (2013.01); *B32B 2553/00* (2013.01)

(58) Field of Classification Search
CPC ........ B32B 2307/414; B32B 2307/514; B32B 2307/516; B32B 2307/7244; B32B 2307/7248; B32B 2439/70; B32B 2553/00; B32B 27/08; B32B 27/18; B32B 27/306; B32B 27/32; B32B 27/34; B32B 7/023; B32B 7/12; B65D 75/26
See application file for complete search history.

(56) References Cited

U.S. PATENT DOCUMENTS

| | | | |
|---|---|---|---|
| 5,350,788 | A | 9/1994 | Visioli et al. |
| 5,885,703 | A | 3/1999 | Wilkie |
| 6,511,688 | B2 | 1/2003 | Edwards et al. |
| 6,921,581 | B2 | 7/2005 | Van Gelder et al. |
| 8,105,686 | B2 | 1/2012 | Blackwell et al. |
| 9,126,389 | B2 | 9/2015 | Brown |
| 9,802,394 | B2 | 10/2017 | Cavacas et al. |
| 2002/0033550 | A1 | 3/2002 | Suehara |
| 2003/0134982 | A1 | 7/2003 | Hoch et al. |
| 2007/0031690 | A1 | 2/2007 | Busche et al. |
| 2008/0095960 | A1 | 4/2008 | Schell et al. |
| 2011/0236668 | A1 | 9/2011 | Bader et al. |
| 2015/0282978 | A1 | 10/2015 | Henderson |

FOREIGN PATENT DOCUMENTS

| | | |
|---|---|---|
| WO | 2016109023 A1 | 7/2016 |
| WO | 2017189836 A1 | 11/2017 |
| WO | 2019231442 A1 | 12/2019 |

OTHER PUBLICATIONS

Breese, "Benefits of Machine Direction-Oriented (MDO) Films in Flexible-Packaging Applications", Flexible Packaging Substrates, Apr. 1, 2011, pp. 32-36.

ORIENTED FILM CONTAINING RECYCLED POLYAMIDE

TECHNICAL FIELD

The present application relates generally to a packaging film, and in particular to a low odor packaging film.

BACKGROUND

The production and use of multilayer films produce polymeric waste streams. For example, some film converting processes require that the edges of the film be trimmed away in order to produce a high-quality film. Similarly, when a package is produced from a film, a "skeleton" of trim waste may remain after the production. The multicomponent nature of these films prevents them from being easily recycled in large scale recycling processes. Separation of the materials from each other is typically either impossible or impractical. Reprocessing of the unseparated material often results in inefficient processing and poor product quality due to the incompatibility of the materials. Often films that are manufactured using even a small amount multicomponent polymeric waste suffer from poor mechanical properties and appearance.

The use of various types of compatibilizers has improved recycling of waste from multilayer or multicomponent films. A polymeric multicomponent film can be recycled by melt blending, allowing the compatibilizers to reduce the phase separation of the materials and introducing the blend into part or all of a film construction via extrusion. The resulting films have appearance and physical properties appropriate for some applications. However, films that contain polyamide as part or all of the recycled content often exhibit a strong odor, which is not rectified by compatibilizer addition. The odor can be intensified, based on certain additional components. The odor prevents the use of the films with recycled content from being used for packaging items that are organoleptically sensitive, such as food.

SUMMARY

A low odor packaging film has been developed including an oriented film to reduce haziness of the low odor packaging film so that the low odor packaging film may be aesthetically appealable. The oriented film includes an inner layer having a multicomponent recyclate. The inner layer is between a first odor barrier layer and a second odor barrier layer. The first odor barrier layer and the second odor barrier layer may prevent or reduce transmission of odor from the multicomponent recyclate to a product(s) packaged in the low odor packaging film. The low odor packaging film may then be used to package edible product(s). Further, the first odor barrier layer and the second odor barrier layer may prevent or reduce transmission of odor from the multicomponent recyclate to an external environment of the low odor packaging film. Therefore, odor from the multicomponent recyclate is trapped within the low odor packaging film between the first and second odor barrier layers and the low odor packaging film has a low odor profile. Odor apparent from outside may negatively affect a user or a customer experience.

In an embodiment, a low odor packaging film including an oriented film is disclosed. The oriented film includes an inner layer having a multicomponent recyclate, a first odor barrier layer, and a second barrier layer. The inner layer is between the first odor barrier layer and the second odor barrier layer.

Conventional packaging films including a multicomponent recyclate may exhibit a strong odor. The odor prevents the use of the packaging films including the multicomponent recyclate from being used for packaging products that are organoleptically sensitive, such as edible products. Further, the packaging films including the multicomponent recyclate are typically hazy and/or smoky in color, thereby affecting appearance of the packaging films and negatively affecting a user experience.

The first and second odor barrier layers may prevent the transmission of odor causing compounds from the inner layer such that the low odor packaging film has a low odor profile. Thus, the low odor packaging film of the present disclosure may not exhibit offensive odor and may be useful for packaging organoleptically sensitive products, such as edible products. Further, the oriented film may substantially reduce haziness of the low odor packaging film. Thus, the low odor packaging film including the oriented film may be more transparent and aesthetically appealing than a conventional packaging film. In many cases, it is desirable for a packaging film to be transparent such that a product packaged within the packaging film is clearly visible.

In some embodiments, the first odor barrier layer and the second odor barrier layer each include a material having an oxygen transmission rate (OTR) of less than 150 cm$^3$ 25 micron/m$^2$ day when tested at 23° C. and 50% Relative Humidity (RH).

In some embodiments, the first odor barrier layer and the second odor barrier layer include at least one of a polyamide or an ethylene vinyl alcohol copolymer and the second odor barrier layer includes at least one of a polyamide or an ethylene vinyl alcohol copolymer.

In some embodiments, the inner layer further includes a compatibilizer.

In some embodiments, the inner layer further includes an odorous derivative of caprolactam.

In some embodiments, the multicomponent recyclate includes a polyamide and a polyolefin.

In some embodiments, the polyolefin is a polyethylene or a polypropylene.

In some embodiments, the multicomponent recyclate further includes an ethylene vinyl alcohol copolymer.

In some embodiments, the oriented film has been oriented by a factor of at least 2 in the machine direction.

In some embodiments, the first and second odor barrier layers reduce the transmission of the odorous derivative of caprolactam from the inner layer such that the packaging film has a low odor profile.

In some embodiments, the oriented film has a haze value at least 25% lower than a non-oriented film of the same composition and structure.

In some embodiments, the oriented film has a gloss value greater than 60%.

In another embodiment, a low odor packaging film including an oriented film is disclosed. The oriented film includes a first odor barrier layer, an inner layer, and a second odor barrier layer. The inner layer includes a polyamide, a polyolefin and a compatibilizer. The inner layer is positioned between the first and second odor barrier layers.

In some embodiments, the first odor barrier layer and the second odor barrier layer each includes a polyamide.

In some embodiments, the inner layer is directly adjacent to the first odor barrier layer and the second odor barrier layer is directly adjacent to the inner layer.

In some embodiments, the low odor packaging film further includes a first polymeric adhesive layer located between the first odor barrier layer and the inner layer, and a second polymeric adhesive layer located between the inner layer and the second odor barrier layer.

In some embodiments, the oriented film has been oriented by a factor of at least 2 in the machine direction.

In some embodiments, the oriented film has a gloss value greater than 60%.

In yet another embodiment, a method of producing a low odor packaging film is disclosed where the polyamide and the polyolefin of the inner layer are introduced as an unseparated multicomponent recyclate.

In another embodiment, a low odor packaging film including an oriented film is disclosed. The oriented film includes an inner layer including recycled polyamide, a first odor barrier layer, and a second odor barrier layer. The inner layer is present between the first and second odor barrier layers.

There are several other aspects of the present subject matter which may be embodied separately or together. These aspects may be employed alone or in combination with other aspects of the subject matter described herein, and the description of these aspects together is not intended to preclude the use of these aspects separately or the claiming of such aspects separately or in different combinations.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

Figure 1:
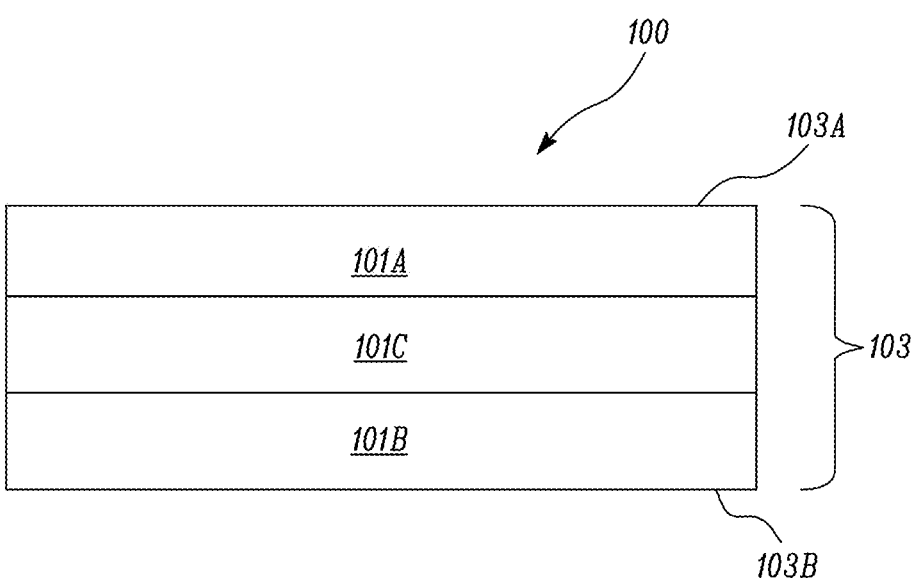
FIG. 1 illustrates a cross-sectional view of a low odor packaging film in accordance with an embodiment of the present disclosure.

The drawings show some but not all embodiments. The elements depicted in the drawings are illustrative and not necessarily to scale, and the same (or similar) reference numbers denote the same (or similar) features throughout the drawings.

DETAILED DESCRIPTION

The present application describes a low odor packaging film including an oriented film. The oriented film includes an inner layer having a multicomponent recyclate, a first odor barrier layer, a second barrier layer. The inner layer is between the first odor barrier layer and the second odor barrier layer.

Conventional packaging films including a multicomponent recyclate are typically hazy, thereby affecting an appearance of the packaging films, and negatively affecting a user experience. Further, the multicomponent recyclate used in the packaging films causes an unpleasant odor, which may further negatively affect the user experience. The odor may further permeate to an interior of the packaging films, potentially causing a packaged product to take on the odor. Odors emanating from the packaging films are particularly problematic for edible products as the odor can alter a taste and odor profile of the edible products. The unpleasant odor can be attributed to oxidized forms of monomer and oligomers resulting from polyamide de-polymerization during high heat processing, such as extrusion, that take place during recycling. Oxidized caprolactam may also be a source of the odor. Further, the multicomponent recyclate including polyamide, polyolefin and/or ethylene-vinyl alcohol copolymers (EVOH) may exhibit higher levels of odor.

A low odor packaging film has been developed including an oriented film to reduce haziness or blurriness of the low odor packaging film. The oriented film includes an inner layer having a multicomponent recyclate. The inner layer is located between a first odor barrier layer and a second odor barrier layer. The first odor barrier layer and the second odor barrier layer may prevent or reduce transmission of odor causing compounds from the multicomponent recyclate to a product(s) packaged in the low odor packaging film.

Therefore, the present disclosure is directed to the use of an oriented film in a low odor packaging film to reduce haziness due to the multicomponent recyclate while overcoming odor issue.

The low odor packaging film of the present disclosure may be transparent. The transparent low odor packaging film may further allow visual inspection of a product disposed inside the low odor packaging film. The transparent low odor packaging film may be aesthetically appealing and may enhance the user experience. In many cases, it is desirable for a packaging film to be transparent such that a product packaged within the packaging film is clearly visible.

As used in the present disclosure, the term "film" is a material with a very high ratio of length or width to thickness. A film has two major surfaces defined by a length and width. Films typically have good flexibility and can be used for a wide variety of applications, including flexible packaging. Films may also be of thickness and/or material composition such that they are semi-rigid or rigid. Films described in the present disclosure are composed of various polymeric materials but may also contain other materials, such as metals or papers. Films may be described as mono-layer or multilayer.

As used in the present disclosure, the term "layer" refers to a thickness of material within a film that has a relatively consistent formula. Layers may be of any type of material including polymeric, cellulosic, and metallic or a blend thereof. A given polymeric layer may consist of a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used in the present disclosure, the term "inner layer" refers to a layer of a film structure which does not reside on either major exterior surface of the film. An inner layer may consist of a single layer or may be multi-layered. There may be one or more inner layers in a film.

As used in the present disclosure, the term "package" refers to any article or combination of articles used to wholly or partially surround an item. A package may take many, various forms. For example, the term "package" may include bags that wholly surround an item (or items) to be packaged; the term "package" may also include films that partially surround an item (or items) to be packaged and, when used in conjunction with another material (such as a tray), wholly surround an item (or items).

As used in the present disclosure, the term "oriented" refers to a monolayer or multilayer film, sheet, or web which has been elongated in at least one of the machine direction or the transverse direction. Such elongation is accomplished by procedures known to a person of ordinary skill in the art. Non-limiting examples of such procedures include the single bubble blown film extrusion process and the slot case sheet extrusion process with subsequent stretching, for example, by tentering, to provide orientation. Another example of such procedure is the trapped bubble or double bubble process. (See, for example, U.S. Pat. Nos. 3,546,044 and 6,511,688, each of which is incorporated in its entirety in this application by this reference.) In the trapped bubble or double bubble process, an extruded primary tube leaving the tubular extrusion die is cooled, collapsed, and then oriented by reheating, reinflating to form a secondary bubble and recooling. Transverse direction orientation may be accomplished by inflation, radially expanding the heated film tube. Machine direction orientation may be accomplished by the use of nip rolls rotating at different speeds, pulling, or drawing the film tube in the machine direction. The combination of elongation at elevated temperature followed by cooling causes an alignment of the polymer chains to a more parallel configuration, thereby improving the mechanical properties of the film, sheet, web, package or otherwise. Upon subsequent heating of an unrestrained, unannealed, oriented article to its orientation temperature, heat-shrinkage (as measured in accordance with ASTM Test Method D2732, "Standard Test Method for Unrestrained Linear Thermal Shrinkage of Plastic Film and Sheeting," which is incorporated in its entirety in this application by this reference) may be produced. Heat-shrinkage may be reduced if the oriented article is annealed or heat-set by heating to an elevated temperature, preferably to an elevated temperature which is above the glass transition temperature and below the crystalline melting point of the polymer comprising the article. This reheating/annealing/heat-setting step also provides a polymeric web of uniform flat width. The polymeric web may be annealed (i.e., heated to an elevated temperature) either in-line with (and subsequent to) or off-line from (in a separate process) the orientation process.

As used in the present disclosure, the term "non-oriented" refers to a monolayer or multilayer film, sheet or web that is substantially free of post-formation orientation.

As used in the present disclosure, the term "directly adjacent" identifies two layers of a film that share an interface, i.e., two layers of the film that contact each other such that a surface forms a common boundary between the two layers.

As used in the present disclosure, the term "haze" refers to the scattering of light as it passes through a material. It refers to the specific light-transmitting and wide-angle-light scattering properties of planar sections of a material. Haze may be determined in accordance with ASTM D1003-92 ("Standard Test Method for Haze and Luminous Transmittance of Transparent Plastics"). Haze values are reported in percent. A high haze value generally reflects a material that is more cloudy and less transparent. A low haze value generally reflects a material that is less cloudy and more transparent.

As used in the present disclosure, the term "gloss" refers to the shiny appearance of a material. It is a measure of the light reflected by the surface of a material and is measured at a specific angle of reflection (20, 45, 60, 75, or 85 degrees) against a specific backing. Gloss may be determined in accordance with ASTM D2457-90 ("Standard Test Method for Specular Gloss of Plastic Films and Solid Plastics"). Gloss values are reported in Gloss Units. A high gloss value generally indicates a material that is shinier.

As used in the present disclosure, the term "derivative" means a chemical substance related structurally to another substance and theoretically derivable from it. As it applies to some embodiments, the odor emanating compounds are theoretically fragments of polyamide copolymers which have been degraded through the recycling process. As it applies to some embodiments, the odorous derivatives of caprolactam are caprolactam molecules which have been oxidized during extended high temperature exposure.

As used in the present disclosure, the term "EVOH" refers to ethylene-vinyl alcohol copolymer. EVOH is otherwise known as saponified or hydrolyzed ethylene-vinyl alcohol copolymer and refers to a vinyl alcohol copolymer having an ethylene comonomer. EVOH is commonly used in multilayer packaging films to provide oxygen barrier. EVOH copolymers typically used in packaging applications include from about 24-48 mole % ethylene. EVOH can be blended with other materials to modify the properties but is typically used as the single component of a barrier layer. EVOH is typically incorporated into an inner layer of a multilayer film.

As used in the present disclosure, the term "polyamide" refers to a high molecular weight polymer having amide linkages (—CONH—)n which occur along the molecular chain, and includes "nylon" resins which are well known polymers having a multitude of uses including utility as packaging films, bags, and casings. Examples of polyamide polymeric resins for use in food packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T disclosed at 21 CFR § 177.1500. Examples of polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof. Polyamides are preferably selected from nylon compounds approved for use in producing articles intended for use in processing, handling, and packing edibles.

Polyamide is used in films for packing edible(s) and other applications because of its unique physical and chemical properties. Polyamide can be used by itself (i.e., monolayer biaxially oriented polyamide webs) or in composite structures, blended or layered with other polymers. Polyamide is selected as a material to improve temperature resistance, abrasion resistance, puncture strength and/or barrier of films. Properties of polyamide-containing films can be modified by selection of a wide variety of variables including copolymer selection, converting methods (e.g., coextrusion, lamination, and coating), and post converting processing such as orientation. Often, polyamide layers are combined with layers containing materials belonging to other polymer families, such as polyolefin, polymeric adhesives, and barrier polymers, to produce a film appropriate for specific applications. It is not uncommon for packaging films to contain blends or combinations of layers that include polymers from many families.

The term "polymeric adhesive layer", "adhesive layer", or "tie layer", refers to a layer or material placed in or on one or more layers to promote the adhesion of that layer to another surface. Preferably, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may include components of both the first layer and the second layer to promote simultaneous adhesion of the adhesive layer to both the first layer and the second layer to opposite sides of the adhesive layer.

The term "oxygen transmission rate" (OTR) is defined in the present disclosure as the amount of oxygen that will pass through a material in a given time period. OTR may be defined for a specific oxygen barrier material and is typically defined with an upper and/or lower limit using units of $cm^3$ 25 $\mu m/m^2$ day, or similar units, when measured at a defined temperature and humidity. Oxygen barrier materials useful in odor barrier layers may have an OTR value of less than 150 $cm^3$ 25 $\mu m/m^2$ day when tested at 23° C. and 50% Relative Humidity (RH). In some embodiments, the oxygen barrier materials useful in odor barrier layers may have an OTR value of less than 100 $cm^3$ 25 $\mu m/m^2$ day, less than 50 $cm^3$ 25 $\mu m/m^2$ day, or less than 10 $cm^3$ 25 $\mu m/m^2$ day when tested at 23° C. and 50% RH.

Additionally, OTR may be defined for a multilayer film. The OTR of a multilayer film is the result of the sequential contribution of each layer within the film. An OTR of a multilayer film is typically defined with an upper and/or lower limit using units of $cm^3/m^2$ day, or similar units, when measured at a defined temperature and humidity. Multilayer films which are useful as low odor packaging films may have an OTR value of from about 0.001-200 $cm^3/m^2$ over 24 hr. at 80% R.H. and 23° C. Oxygen transmission may be measured according to ASTM D-3985-81 which is incorporated in the present disclosure by reference.

As used in the present disclosure, the term "recyclate" or "recycled" refers to a polymer based material being used to form an extruded layer of a film, the polymer based material having been previously formed into a product (e.g., film) by an extrusion process. The recyclate may be subjected to other processing steps, such as pelletization, between the extrusion that formed the initial product and the extrusion step that now uses the recyclate. The recyclate may be blended with other non-recycled polymer materials. A "multicomponent recyclate" has more than one type of polymer present, which may be sourced from a single previous product, such as a multilayer film, or sourced from more than one previous product.

For a given recyclate, the materials of the initial polymer product may have been substantially unseparated such that any materials that may have been in separate layers of the initial film remained together in bonded layers and are now intermingled or mixed or blended in a single layer of the current film. This type of recyclate is referred in the present disclosure as an "unseparated multicomponent recyclate".

As used in the present disclosure, "odor barrier material", or "odor barrier layer" refers to a material or layer of a film having properties that block or slow the transmission of odorous compounds. Traditionally, odor barrier layers have been used to prevent the transmission of a compound through a film, containing that compound, to one side of the film. As used in the present disclosure, the odor barrier layers are being used in combination (at least two odor barrier layers) to contain odorous compounds within the film. The odorous compounds introduced into the multilayer film as part of the recyclate containing inner layer are prevented, or significantly blocked, from migrating out of the film at both major surfaces. The odor barrier materials have properties that slow the migration of oxidized caprolactam such that a product packaged within the multilayer film will not have the odor or flavor profile significantly affected by the odor.

The odor barrier materials that can be used in the odor barrier layers include those that are generally considered good oxygen barrier materials, as these are similar and analogous properties. In this light, materials that can be used for the odor barrier material include EVOH, polyvinylidene chloride (PVdC) copolymers, polyamide copolymers, exfoliated clay matrices, and any other materials commonly used in high barrier packaging structures for the purpose of oxygen transmission blocking. Preferably, the odor barrier layers include polyamide or EVOH.

The odor barrier materials may be blended with other components, as may be required for other processing requirements, performance characteristics or economic value. The odor barrier layers may have any thickness necessary as long as the layers function as required for odor migration prevention. The odor barrier layers may be split into multiple layers, such as polyamide-polymeric adhesive-polyamide, that effectively act together to block the odor migration. The odor barrier layers may have the same or different composition.

As used in the present disclosure, "polyolefin" refers to polyethylene homopolymers, polyethylene copolymers, polypropylene homopolymers or polypropylene copolymers.

As used in the present disclosure, "polyethylene" refers to polymers that include an ethylene linkage. Polyethylenes may be a homopolymer, copolymer or interpolymer. Polyethylene copolymers or interpolymers may include other types of polymers (i.e., non-polyethylene polymers). Polyethylenes may have functional groups incorporated by grafting or other means. Polyethylenes include, but are not limited to, low-density polyethylene (LDPE), linear low density polyethylene (LLDPE), medium-density polyethylene (MDPE), ultra-low density polyethylene (ULDPE), high-density polyethylene (HDPE), cyclic-olefin copolymers (COC), ethylene vinyl acetate copolymers (EVA), ethylene acrylic acid copolymers (EAA), ethylene methacrylic acid copolymers (EMAA), neutralized ethylene copolymers such as ionomer, and maleic anhydride grafted polyethylene (MAHgPE).

As used in the present disclosure, "polypropylene" refers to polymers that are derived from monomers of propylene. Polypropylenes may be a homopolymer, copolymer or interpolymer. Polypropylene copolymers or interpolymers may include other types of polymers (i.e., non-polypropylene polymers). Polypropylenes may have functional groups incorporated by grafting or other means. Polypropylenes include, but are not limited to, propylene-ethylene copolymers, ethylene-propylene copolymers, and maleic anhydride grafted polypropylenes (MAHgPP).

As used in the present disclosure, "odor causing components", or "odor emanating compounds" refers to migratory molecules that may be present within an inner layer of a film. These compounds or components may be present due to conditions present during extrusion which can promote depolymerization of the polymers. Alternatively, the compounds may be derivatives of monomers that are present in the polymer from the polymerization process (i.e., caprolactam is present in nylon-6). In either case, the compounds are theorized to be oxidative derivatives of relatively small molecules. In any case, the compounds are detectable by smell or taste.

Polymer materials are typically subjected to high heat when shaped and formed into usable products, i.e., extrusion. Recycled polymers are repeatedly subjected to incidents of high heat and excessive shear stress, which can cause degradation of the polymer. Under these conditions oxidation may occur, and specifically may happen to any monomers and oligomers that may be a result of depolymerization or remaining from the original polymerization of the polymer. Oxidized materials can result from the repeated extrusion processes. Polyamides and specifically nylon-6 can be particularly susceptible to producing odor emanating compounds, specifically odorous derivatives of caprolactam (i.e., oxidized caprolactam).

Without being bound by theory, the odors generated during reprocessing of recycled polyamide are typically attributed to oxidized caprolactam. The odor causing components may be oxidized caprolactam, or similar monomers or oligomers, which are present in nylon-6 as a result of incomplete polymerization. Alternatively, the odor causing components may be oxidized components that are a result of polyamide depolymerization fragments that result from overprocessing.

FIG. 1 shows a cross-sectional view of a low odor packaging film 100 in accordance with an embodiment of the present disclosure. Low odor packaging film 100 includes an oriented film 103. Oriented film 103 includes a first major surface 103A and a second major surface 103B opposite to first major surface 103A. Oriented film 103 includes a first odor barrier layer 101A, a second odor barrier layer 101B, and an inner layer 101C. Inner layer 101C is between first odor barrier layer 101A and second odor barrier layer 101B. First and second odor barrier layers 101A and 101B may be located on first major surface 103A and second major surface 103B, respectively. In other words, first odor barrier layer 101A may include first major surface 103A of oriented film 103 and second odor barrier layer 101B may include second major surface 103B of oriented film 103. As shown in FIG. 1, inner layer 101C is directly adjacent to first odor barrier layer 101A and second odor barrier layer 101B is directly adjacent to inner layer 101C. However, in some embodiments, there may be one or more intervening layers.

In some embodiments, additional layers may be disposed on one or both of first and second major surfaces 103A, 103B.

In some embodiments, inner layer 101C may also include polymeric adhesive materials. Specifically, in cases inner layer 101C is directly adjacent to first and second odor barrier layers 101A, 101B, the polymeric adhesive material in inner layer 101C may aid in interlayer adhesion. Alternatively, the polymeric adhesive may be in the intervening layers between inner layer 101C and first and second odor barrier layers 101A, 101B. Depending on the chemical makeup of inner layer 101C and first and second odor barrier layers 101A, 101B, and also depending on the interlayer adhesion performance criteria for the application, oriented film 103 may not require any polymeric adhesive components.

Inner layer 101C may be of any desired thickness. In some embodiments, inner layer 101C may be between 0.01% and 50% or between 0.1% and 25% or between 1% and 15% of the thickness of oriented film 103. In some embodiments, inner layer 101C may have a thickness greater than 0.1, greater than 1 or greater than 10 microns.

Inner layer 101C includes a multicomponent recyclate. In some embodiments, the multicomponent recyclate includes a polyamide and a polyolefin. In some embodiments, the polyolefin is a polyethylene or a polypropylene. In some embodiments, inner layer 101C further includes a compatibilizer. Therefore, inner layer 101C may include the polyamide, the polyolefin and the compatibilizer. In some embodiments, inner layer 101C includes a recycled polyamide.

As used in the present disclosure, the term "recycled polyamide" refers to a recycled material including polyamide. The recycled material has been previously formed into an article by heating to a melted state and resolidifying.

In some embodiments, inner layer 101C may include greater than 5%, 10%, 20%, 40%, 60% or 80% multicomponent recyclate by weight. In some embodiments, inner layer 101C may include greater than 25%, 30%, 35%, 40%, 45% or 50% multicomponent recyclate by weight. In some embodiments, inner layer 101C may include 100% multicomponent recyclate by weight. In some embodiments, inner layer 101C may have a material that is an unseparated multicomponent recyclate. In some embodiments, the polyamide, and the polyolefin of inner layer 101C are introduced as the unseparated multicomponent recyclate.

In some embodiments, inner layer 101C may include 5%, 10%, 15% or 20% compatibilizer by weight. The compatibilizer may be introduced as part of the multicomponent recyclate or may be added as a separate component to inner layer 101C. Any compatibilizer known in the art may be used as an aid to allow components of inner layer 101C to become a more homogenous blend.

Compatibilizers can be added to the multicomponent recyclate to assist in homogenizing the multicomponent recyclate. Compatibilizers are functional additives that can be added to blends of incompatible materials to assist in achieving a blend with improved mechanical properties. The incompatible materials may be from recyclate or other sources. Often, a blend of incompatible materials has insufficient properties for end use applications. Functional additives may improve this compatibility. The general principle of compatibilization is to reduce interfacial energy between two polymers in order to increase adhesion. Generally, adding a polymer compatibilizer also results in finer dispersion, as well as more regular and stable morphologies. Adding compatibilizers generally increases mechanical performance and improves appearance properties. Examples of useful compatibilizers are Fusabond® E226 (available from DuPont™) and Orevac® OE825 (available from Arkema).

In some embodiments, the multicomponent recyclate includes less than 50% polyamide by weight. In some embodiments, the multicomponent recyclate includes less than 45%, less than 40%, less than 35%, or less than 30% polyamide by weight.

In some embodiments, inner layer 101C includes an odorous derivative of caprolactam. In such embodiments, first and second odor barrier layers 101A, 101B reduce the transmission of the odorous derivative of caprolactam from inner layer 101C such that low odor packaging film 100 has a low odor profile.

In some embodiments, the multicomponent recyclate further includes an EVOH. The multicomponent recyclate including both the polyamide and the EVOH tends to exhibit very high odor levels. By using first and second odor barrier layers 101A and 101B on each side of inner layer 101C, first and second odor barrier layers 101A, 101B may ensure that low odor packaging film 100 has a low odor profile. Specifically, first odor barrier layer 101A and second odor barrier layer 101B may significantly slow or block the odors emanating from the multicomponent recyclate of inner layer 101C from transferring either to an exterior or to an interior of low odor packaging film 100. In this manner, odors are trapped between first and second odor barrier layers 101A, 101B and low odor packaging film 100 has a low odor profile.

In some embodiments, first odor barrier layer 101A and second odor barrier layer 101B include at least one of a polyamide or an EVOH. In some embodiments, first odor barrier layer 101A and second odor barrier layer 101B each includes a polyamide. In some embodiments, first odor barrier layer 101A and second odor barrier layer 101B are made of the same material, i.e., both first and second odor barrier layer 101A and 101B, respectively, include the polyamide or the EVOH. However, a material of first odor barrier layer 101A may be different from a material of second odor barrier layer 101B. For example, first odor barrier layer 101A may include the polyamide and second odor barrier layer 101B may include the EVOH or vice-versa.

First and second odor barrier layers 101A, 101B may further include any general composition, including polymeric materials, inorganics, or combinations thereof. The polymeric materials may be any that provide barrier to odorous compounds, including, but not limited to polyesters, polyamides, or cyclic olefin copolymers (COC). The inorganics include, but are not limited to, exfoliated nano clays.

In some embodiments, first odor barrier layer 101A and second odor barrier layer 101B each include a material having an oxygen transmission rate (OTR) of less than 150 cm³ 25 μm/m² day when tested at 23° C. and 50% relative humidity (RH). This may help in reducing or preventing the interference of oxygen with a product or an item, especially an edible product packed inside or with low odor packaging film 100. In some embodiments, first odor barrier layer 101A and second odor barrier layer 101B may have an OTR of less than 125, 100, 80, 60, 40, 20, 10, 5, 2 or 1 cm³ 25 μm/m² day when tested at 23° C. and 50% RH.

Low odor packaging film 100 including the multicomponent recyclate content and first and second odor barrier layers 101A and 101B may also include other layers as necessary for the application in which the film is used. For example, low odor packaging film 100 may have an exterior layer that has abuse resistance properties or specialized appearance properties. Ink, pigments, or other materials may be added to low odor packaging film 100 for graphical improvements, light blocking or to meet other requirements. In some embodiments, additional layers or materials may be added to enhance moisture barrier properties of low odor packaging film 100. Additional layers may be added by any known means including, but not limited to, coextrusion, coating, vapor deposition, extrusion lamination, or adhesive lamination.

Figure 2:
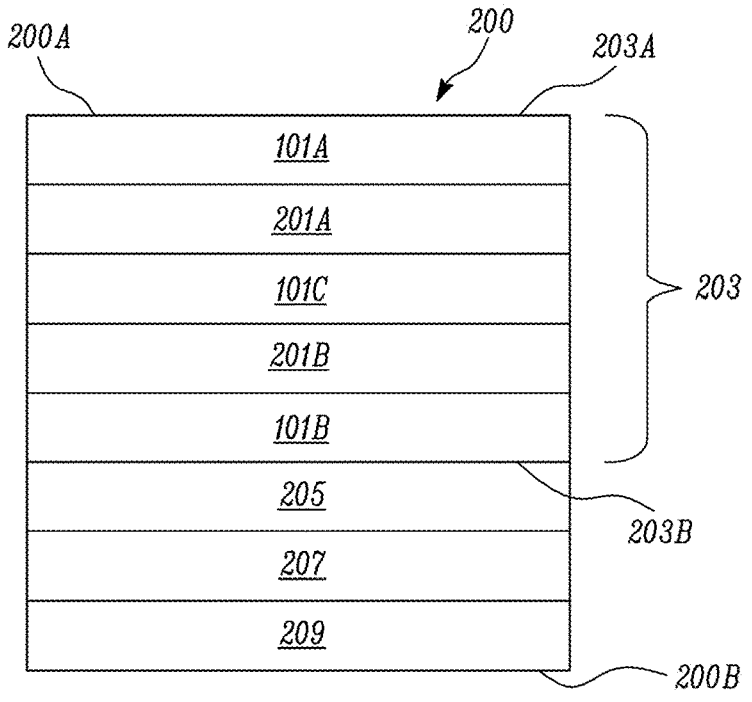
FIG. 2 illustrates a cross-sectional view of a low odor packaging film in accordance with another embodiment of the present disclosure.

FIG. 2 shows a cross-sectional view of a low odor packaging film 200 in accordance with another embodiment of the present disclosure. Low odor packaging film 200 is substantially similar to low odor packaging film 100 illustrated in FIG. 1. Low odor packaging film 200 includes a first major surface 200A and a second major surface 200B opposite to first major surface 200A. When used in a package, first major surface 200A may form the exterior of the package, exposed to the environment, and second major surface 200B may form the interior of the package, exposed to the product.

Low odor packaging film 200 includes an oriented film 203 having a first major surface 203A and a second major surface 203B opposite to first major surface 203A. Oriented film 203 includes inner layer 101C, first odor barrier layer 101A and second odor barrier layer 101B. However, low odor packaging film 200 further includes a first polymeric adhesive layer 201A located between first odor barrier layer 101A and inner layer 101C. Low odor packaging film 200 further includes a second polymeric adhesive layer 201B located between second odor barrier layer 101B and inner layer 101C. First and second odor barrier layers 101A and 101B may be located on first major surface 203A and second major surface 203B, respectively. In other words, first odor barrier layer 101A may include first major surface 203A of oriented film 203 and second odor barrier layer 101B may include second major surface 203B of oriented film 203. Low odor packaging film 200 further includes an ink layer 205 disposed adjacent to second odor barrier layer 101B. In other words, ink layer 205 is disposed on second major surface 203B of oriented film 203. Oriented film 203 may advantageously provide dimensional stability through a printing process and may allow application of one or more printing layers with sufficient layer thickness for ensuring in-register prints (i.e. the oriented film 203 shrinks very little or not at all through the printing process). As used in the present disclosure, the term "ink" refers to an opaque or translucent material formulated to bond to a film, such as ink layer 205. Inks include, for example, solvent-based inks, water-based inks, electron-beam-curing inks, ultraviolet-curing inks, and two-part inks.

Low odor packaging film 200 further includes an adhesive layer 207 and a sealing layer 209. Sealing layer 209 may be laminated on ink layer 205 using adhesive layer 207. In other words, adhesive layer 207 may aid in adhesion of sealing layer 209 to the remainder of the packaging film 200. Sealing layer 209 may allow package formation. Sealing layer 209 may further act as a protective layer. Sealing layer 209 may be included in a coextruded multilayer film. First major surface 200A of low odor packaging film 200 may be same as first major surface 203A of oriented film 203. First major surfaces 200A, 203A may exposed to an external environment when formed into a package. Second major surface 200B may be exposed to a product when formed into a package and may be attached to another packaging component by formation of a heat seal. Specifically, sealing layer 209 may contact the packaged content.

In some embodiments, each or any of first and second polymeric adhesive layers 201A, 201B and adhesive layer 205 may include a polyolefin copolymer with maleic anhydride grafted functionality. In some embodiments, each or any of first and second polymeric adhesive layers 201A, 201B and adhesive layer 205 includes a maleic anhydride grafted polyethylene (MAHgPE) polymer with a melt index from 0.5 to 10 g/10 min.

Figure 3:
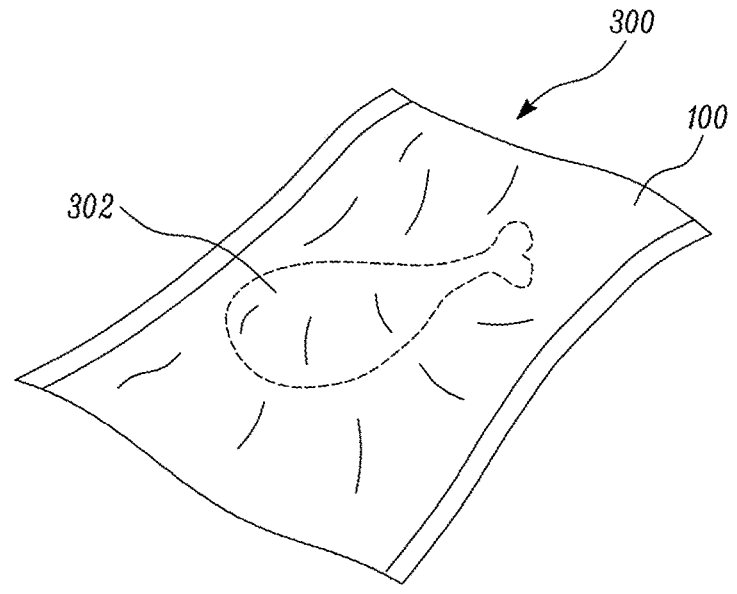
FIG. 3 illustrates a perspective view of a package utilizing a low odor packaging film in accordance with an embodiment of the present disclosure.

FIG. 3 shows a perspective view of a package 300 utilizing low odor packaging film 100. However, in some embodiments, package 300 may utilize low odor packaging film 200 illustrated in FIG. 2. As shown in FIG. 3, low odor packaging film 100 is sealed to itself or any other packaging component to form package 300 to enclose a product 302. In some cases, package 300 may be hermetically sealed around product 302 for protection.

In the illustrated embodiment of FIG. 3, product 302 in package 300 is an edible product. In some embodiments, the edible product may include a dry or a liquid product. In some other embodiments, product 302 may be, but is not limited to, a personal care product, a pet food, a medical product, a pharmaceutical product, a first aid product, a nutritional aid product, or a beverage. Package 300 may take any number of forms including pouches, bags, trays/lids, clamshells, boxes, sachets, flow wrap, or bottles. In some embodiments, package 300 may be in a form of cup/lid. The lid of the cup/lid package may include low odor packaging film 100 or low odor packaging film 200. Package 300 may include a single serving or may have multiple servings. Package 300 may include additional features such as a zipper for reclose. In some embodiments, low odor packaging film 100 is required to be heat sealable. Heat sealing requires portions of low odor packaging film 100 (i.e., exterior layers such as the oriented film 103, 203) to be heat resistant and portions of low odor packaging film 100 (i.e., a sealing layer 209) to be capable of forming a strong seal with another packaging component. Advantageously, the oriented film 103 or 203 offers excellent heat resistance for superior sealing performance when located on the exterior facing major surface 100A or 200A of the low odor packaging film 100 or 200. Sealing layers are widely documented and can be any known formula and structure combination to create heat seals required for an application. Alternatively, the sealing layers of low odor packaging film 100 may be formulated for other types of sealing, such as ultrasonic sealing.

By using package 300 including low odor packaging film 100, an odor and taste profile of product 302 is not impacted by low odor packaging film 100. Product 302 may have a taste profile similar to a taste profile after packaging in a packaging film without a multicomponent recyclate. Further, by using package 300 including low odor packaging film 100, product 302 may be clearly visible and may be visually inspected.

Figure 4:
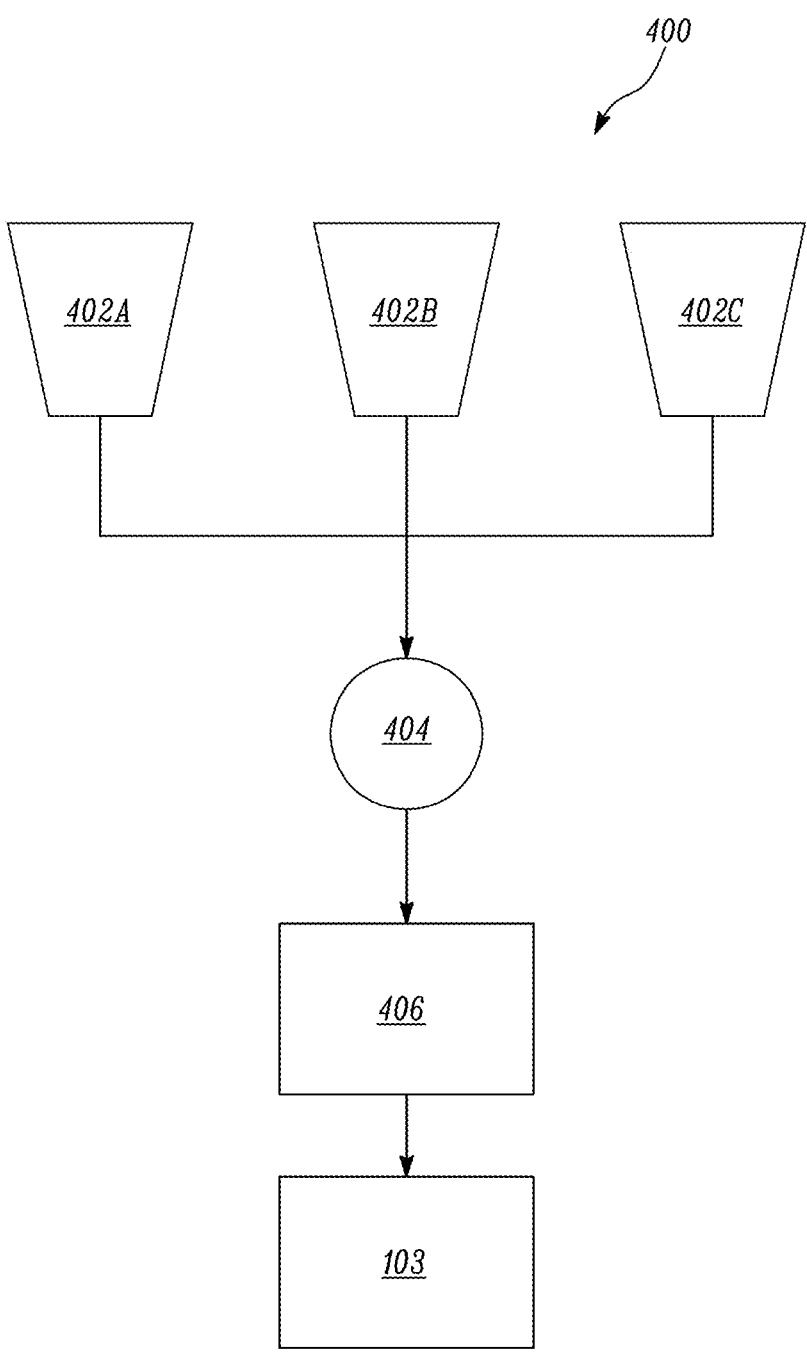
FIG. 4 illustrates a process flow block flow diagram of a method of producing an oriented film in accordance with an embodiment of the present disclosure.

FIG. 4 shows a process flow block diagram of a method 400 of producing oriented film 103. Method 400 may also be used for producing oriented film 203.

Now referring to FIGS. 1 and 4, an odor barrier material is introduced into two extruders, 402A and 402C, where the odor barrier material is melted and mixed with any other components that may be added. In some embodiments, the odor barrier material may be polyamide. The odor barrier material may correspond to a material of first odor barrier layer 101A or second barrier layer 101B. In some embodiments, the material of first odor barrier layer 101A may be introduced in extruder 402A and the material of second odor barrier layer 101B may be introduced in extruder 402C. Similarly, method 400 may include introducing an unseparated multicomponent recyclate into an extruder 402B. The unseparated multicomponent recyclate may be introduced in a form of chopped film, pellets, or any other format. In some embodiments, the polyamide, and the polyolefin of inner layer 101C are introduced as the unseparated multicomponent recyclate. In some embodiments, a material of inner layer 101C is introduced in extruder 402B. Further, the material of inner layer 101C is melted and mixed with any other components that may be added. The other components may be added to inner layer 101C at the point of melting and mixing. The other components may include the compatibilizer, the polymeric adhesive material and/or EVOH The melted materials are fed from extruders 402A, 402B and 402C into an extrusion die 404 where the melted materials are combined in a layered format such that the material of inner layer 101C extruded from extruder 402B is between the material of first odor barrier layer 101A and the material of second odor barrier layer 101B extruded from extruders 402A and 402C, respectively. The material of first odor barrier layer 101A fed into extruder 402A becomes first odor barrier layer 101A. The material of inner layer 101C fed into extruder 402B becomes inner layer 101C. The material of second odor barrier layer 101B fed into extruder 402C becomes second odor barrier layer 101B. The layered material is extruded into a film 406 having a general structure of first odor barrier layer 101A/inner layer 101C/second odor barrier layer 101B.

In an alternative embodiment, the materials for first and second odor barrier layers 101A, 101B may be fed from a same extruder, and split prior to entering a feedblock of extrusion die 404 to form film 406.

Film 406 is typically hazy or blurry and may be aesthetically not appealable. It may be desirable for film 406 to be transparent such that a product is clearly visible when packed with film 406. Haze is scattering of light as it passes through a transparent material, resulting in poor visibility and/or glare. It is preferred that haze level of low odor packaging film 100 be less than 30%, less than 25%, or less than 20% when measured according to ASTM D1003 (Haze and Luminous Transmittance of Transparent Plastics) method B.

Film 406 is passed through an orientation process such as a machine direction orientation machine or apparatus 500 (shown in FIG. 5B) where film 406 is oriented in a machine direction MD to form oriented film 103 that may be transparent and aesthetically appealable. Oriented film 103 may have additional heat resistance and dimensional stability as a result of the orientation process. Oriented film 103 may be further processed to form low odor packaging film 100. Oriented film 203 may be further processed to form low odor packaging film 200. In many cases, it may be desirable for low odor packaging film 100 or 200 to be transparent such that a product (such as product 302 in FIG. 3) packaged in low odor packaging film 100 or 200 is clearly visible.

Low odor packaging film 100 described in the present disclosure may be produced by any means known in the art. The layers of the structures described may be created and combined by way of a multilayer coextrusion process. All, some, or none of the layers may be combined by coextrusion. Layers and materials may be added to low odor packaging film 100 by means of adhesive lamination, extrusion coating, vacuum metallization, solution coating, or printing. Other known processes may be utilized in production of final low odor packaging film 100, as long as the spirit of embodiments disclosed in the present disclosure is met, namely, inclusion of oriented film 103 including the multicomponent recyclate in inner layer 101C present between first and second odor barrier layers 101A and 101B to enable low odor packaging film 100.

Low odor packaging film 100 production may further include other processes to enhance the functionality or overall qualities of low odor packaging film 100. For example, low odor packaging film 100 may be electron beam irradiated to cross-link some of the components therein, as is known in the art. Low odor packaging film 100 may have one or more layers scored by mechanical or high energy (laser) means. The resulting low odor packaging film 100 may have any types of properties including high slip, low slip, high gloss, heat shrinkability, thermoformability, high stiffness, low stiffness, lap sealability, easy openability, reclosability, etc., as long as the spirit of the embodiments described in the present disclosure is not prevented.

Products (such as product 302 of FIG. 3) packed within low odor packaging film 100 advantageously are not affected with respect to odor or taste. Low odor packaging film 100 serves to protect the product therein throughout the packaging, storage, distribution, retailing and consumer use lifetime. Low odor packaging film 100 as disclosed in the present disclosure does not have a negative effect on the product packaged therein due to the multicomponent recyclate, especially as it relates to odor or taste profiles. The product has a similar taste before and after exposure to low odor packaging film 100. Further, low odor packaging film 100 may prevent or reduce transmission of odor from the multicomponent recyclate to an external environment of the low odor packaging film 100. Odor apparent from outside may otherwise negatively affect the user experience.

Figures 5A, 5B, 5C:
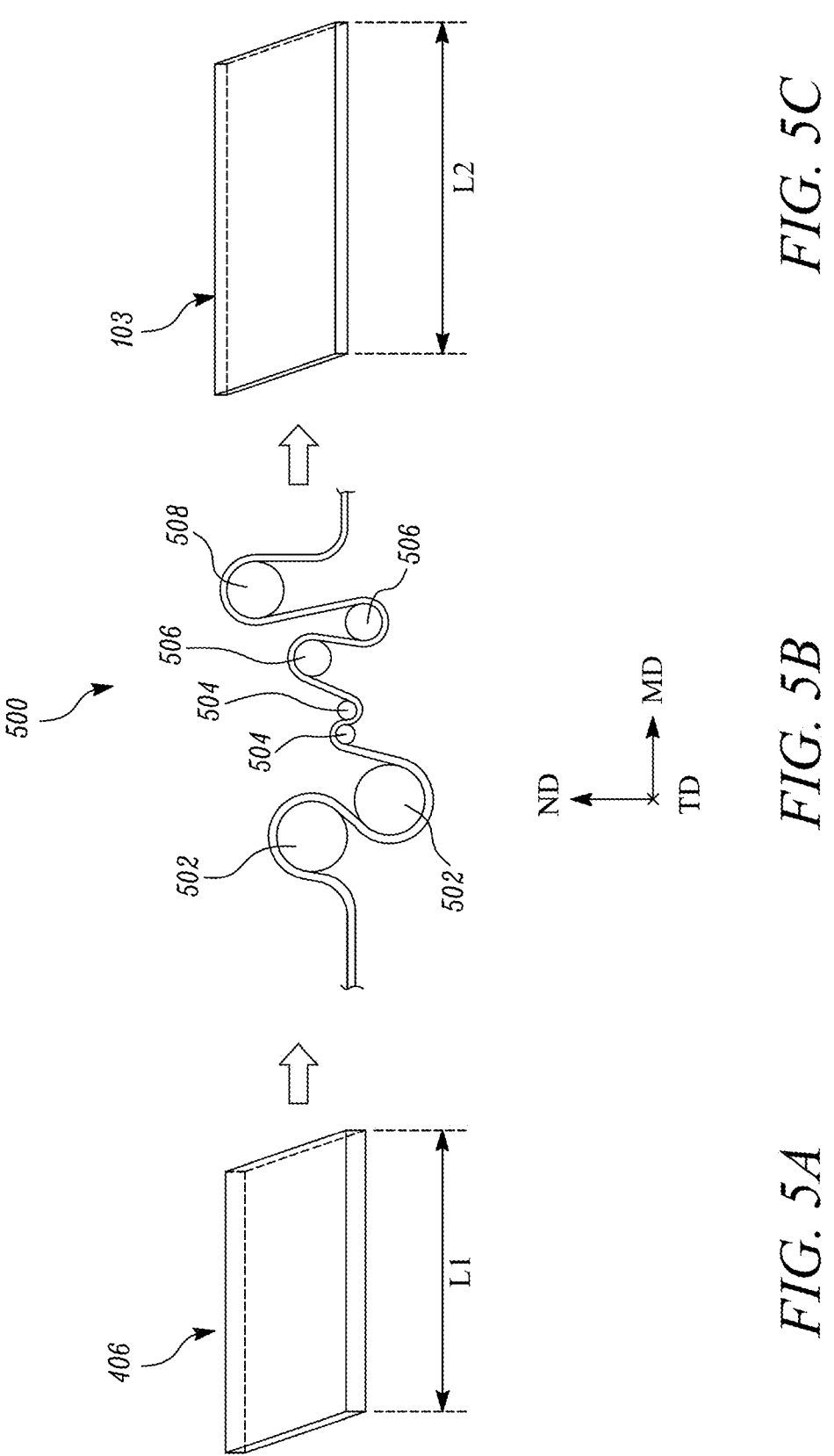
FIGS. 5A-5C illustrate a machine-direction orientation process for orienting a film in accordance with an embodiment of the present disclosure.

FIGS. 5A-5C show a machine-direction orientation process for film 406 using machine direction orientation apparatus 500. Machine direction MD may be a general direction along which film 406 travels during a stretching process, such as the machine-direction orientation process. A transverse direction TD may be a second axis within a plane of film 406 and may be orthogonal to machine direction MD. A normal direction ND may be orthogonal to both machine direction MD and transverse direction TD and correspond generally to the thickness of film 406. Film 406 may be relaxed or non-stretched in machine direction MD and normal direction ND. Film 406 has a length L1 and an initial thickness. Film 406 is passed around a pair of pre-heat rolls 502 of machine direction orientation apparatus 500 which may soften film 406. The softened film 406 is then stretched between a pair of orientation rolls 504. In some embodiments, pair of orientation rolls 504 may rotate at a multiple of a speed of pair of pre-heat rolls 502, corresponding to a factor of stretch ratio. Film 406 is stretched by the factor of stretch ratio. The resultant film is oriented film 103. Oriented film 103 has a length L2 greater than length L1 of film 406. Further, oriented film 103 has a thickness lower than the initial thickness of film 406. In some embodiments, oriented film 103 is oriented by a factor of at least 2 in machine direction MD. In some other embodiments, oriented film 103 is oriented by a factor of at least 3, 4, or 5 in machine direction MD. Film 406 then passes over annealing rolls 506 at which it is annealed or heat-set, and finally passes over a cooling roll 508 to complete the hot-stretch operation. In some embodiments, oriented film 103 has a haze value at least 25% lower than a non-oriented film of the same composition and structure. In some embodiments, oriented film 103 may have the haze value at least 30%, 40%, or 50% lower than a non-oriented film of the same composition and structure. Further, oriented film 103 has a gloss value greater than 60%. In some embodiments, oriented film 103 may have the gloss value greater than 70%, 80%, or 90%. Further, inner layer 101C of oriented film 103 withstands the orientation, adhesion to first and second odor barrier layers 101A, 101B remains good and, most importantly, the transparency of oriented film 103 is improved. Haze and gloss values of low odor packaging film 100 and oriented film 103 may be measured according to ASTM D1003-92 and ASTM D2457-90 standard tests, respectively.

EXAMPLES AND DATA

The following examples are offered for illustrative purposes only and is not intended to limit the scope of the claims in any way. Indeed, various modifications of the disclosure in addition to those shown and described herein will become apparent to those skilled in the art from the foregoing description and the following examples and fall within the scope of the appended claims.

A 3-layer structure was subjected to stretching or an orientation process. Specifically, the 3-layer structure was subjected to a machine direction orientation process. The 3-layer structure included the following layers: 1) a polyamide layer 2) a recycled layer (polyamide/EVOH/polyethylene with polyethylene diluent and adhesive resin), and 3) a polyamide layer.

The 3-layer structure was stretched up to 5 times. It was found that the recycled layer (i.e., recycled polyamide/EVOH/polyethylene with polyethylene diluent and adhesive resin) well withstands the draw, adhesion to the polyamide layers remains good and, most importantly, transparency of the 3-layer structure is improved. Further, odor originating from the recycled layer is successfully encapsulated between the polyamide layers.

In a further experiment, 3-layer structure films of structures listed in Table 1 were produced. Table 1 further shows some exemplary results. The 3-layer structure films listed in Table 1 were subjected to a machine direction orientation process.

Due to thin polyamide (PA) layers in test points 1 and 2, the 3-layer structures of the test points 1 and 2 were not oriented more than 2.8 times. However, orientation of 5.2 times was successful when thicker polypropylenes (PP) layers were used, for example, in test points 3 to 5. An orientation factor of 3.5-4.0 for polyamide may be possible with thicker polyamide layers. It is to be noted that the test points 3 to 5 in Table 1 were only used for demonstration purposes. Specifically, the PP layers of the test points 3 to 5 were only used to demonstrate the orientation potential of the recycled layer. Test points 3 to 5 can therefore be considered as comparative examples and do not include odor barrier films of the present disclosure. The PP layers did not provide encapsulation of odor originating from the recycled layer. Near Infrared (NIR) detection system is generally used for identification of and sorting of waste material in a recycling process. According to certain guidelines, polyamide is a non-wanted substance but generally, 10-25% of polyamide is accepted in a polyethylene (PE) recycled stream if the NIR detection system does not recognize it in the recycling process. However, according to studies, it had been found that increasing the thickness of the polyamide layers may not affect NIR detection. Specifically, increasing the thickness of the polyamide layers such that a polyamide content of the 3-layer structure is below a critical amount accepted by recycling standards would not affect NIR detection. Examples of the recycling standards include standards set by Recyclass Technology committees.

An important observation was made when haze levels of the test points 1 and 4 were compared. The haze level due to the recycled layer was substantially lower with 4 times orientation compared to 2 times orientation even when the recycled layer was thicker in the test point 4.

Therefore, the haze level generated by the recycled layer was substantially reduced as a result of the orientation process.

TABLE 1

| | | | | Key Findings | |
|---|---|---|---|---|---|
| Test point | Structure | Stretch | Interlayer Adhesion | Average layer thicknesses (microns) | Haze level (%) |
| 1 | PA/recycled PE/PA | 2 | Good | 1/13/1 | 13.2 |
| 2 | PA/recycled PE/PA | 2.8 | Good | 1/10/1 | 9.2 |
| 3 | PP/recycled PE/PP | 2 | Good | 3/24/3 | 24.7 |
| 4 | PP/recycled PE/PP | 4 | Good | 2/16/2 | 9.6 |
| 5 | PP/recycled PE/PP | 5 | Good | 1/12/1 | 9.5 |

An intended 3-layer structure may include the following layers: 1) a polyamide layer (approximately 2 microns), 2) a recycled polyamide/EVOH/polyethylene layer with adhesive polymer and possible polyethylene diluent layer (12 microns or greater), and 3) a polyamide layer (approximately 2 microns). The intended 3-layer structure is subjected to a machine direction orientation process. The intended 3-layer structure may have orientation levels equal to or greater than 3 times. The intended 3-layer structure may be extrusion coated with a polyethylene sealing layer having a suitable thickness such that a polyamide content of an intended packaging film structure is below a critical amount accepted by the current recycling standards, for example, standards set by Recyclass Technology committees. The polyamide content of the intended packaging film may be a maximum of 10% by weight or may be up to 20% by weight. In the intended packaging film, the thickness of the polyethylene sealing layer may be 26 microns or greater in cases the thickness of the intended packaging film structure is greater than 40 microns. The intended 3-layer structure and the intended packaging film may be durable and transparent enough for lidding film applications.

In a further experiment, five films were produced on a 3-layer cast coextrusion line having a feed block configuration of A/B/A. Here, the A layers were first and second odor barrier layers 101A, 101B and the B layer was inner layer 101C (as shown in FIG. 1). Two of the five films, Comparative Example 1 and Comparative Example 2 were coextruded and not oriented. Three of the five films, Examples 3, 4 and 5, were coextruded and subsequently machine direction oriented. Structural details of the five films are outlined in Table 2 provided below.

Each of the five films had identical layer compositions. The A layers (first and second odor barrier layers 101A, 101B) included 100% of a medium viscosity polyamide 6. The B layer (inner layer 101C) included 50% of a repelletized multicomponent recyclate material and 50% non-recycled polyethylene-based polymers. The multicomponent recyclate material included approximately 61% polyethylene, 28% polyamide-6, 5% ethylene-vinyl alcohol copolymer, and 6% compatibilizer. All ratios of the layer composition and the multicomponent recyclate material are reported by weight.

Subsequent to coextrusion, the Example films 3, 4, and 5 were subjected to a machine direction orientation process, stretching each of the Example films 3, 4, and 5 by approximately 3 times. Higher extruder outputs were used with the Example films 3, 4 and 5 than with the Comparative Films 1 and 2 to achieve similar layer thicknesses after the machine direction orientation.

TABLE 2

| | Structure for Comparative Example Films and Example Films Having Structure A/B/A | | | | |
|---|---|---|---|---|---|
| | Comp. Ex. 1 | Comp. Ex. 2 | Example 3 | Example 4 | Example 5 |
| 'A' layer thicknesses (μm) | 3, 3 | 2, 2 | 2, 3 | 3, 3 | 3, 3 |
| 'B' layer thickness (μm) | 13 | 11 | 15 | 13 | 12 |

The Comparative Examples 1 and 2, and the Example films 3, 4, and 5 were tested for haze and gloss according to ASTM D1003-92 and ASTM D2457-90 standard tests, respectively.

Results are shown in Table 3 below.

TABLE 3

| | Haze and Gloss Data for Comparative Example Films and Example Films | | | | |
|---|---|---|---|---|---|
| | Comp. Ex. 1 | Comp. Ex. 2 | Example 3 | Example 4 | Example 5 |
| Haze (%) | 8.8 | 14.3 | 5.5 | 6.5 | 5.6 |
| Gloss (%) | 46.6 | 38.8 | 79.5 | 61.6 | 91.3 |

The haze of the Example films 3, 4, and 5 were improved over the haze of the Comparative Examples 1 and 2. Improved haze is important for materials that include multicomponent recyclate, which has a tendency to introduce haze as compared to low odor films that do not include multicomponent recyclate. Upon comparing the haze of the Comparative Example 1 to the haze of the Example 4 film (as these two films had similar layer ratio), it is observed that the machine direction orientation had reduced the haze by greater than 25%. In addition, the machine direction orientation also improved the gloss of the Example films 3, 4, and 5. As discussed earlier, appearance of packaging films may be important for retail packaging applications. Based on the above results, it may be apparent that an oriented film has a haze value at least 25% lower than a non-oriented film of the same composition and structure.

Each and every document cited in this present application, including any cross referenced, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

Unless otherwise indicated, all numbers expressing sizes, amounts, ranges, limits, and physical and other properties used in the present application are to be understood as being preceded in all instances ay the term "about". Accordingly, unless expressly indicated to the contrary, the numerical parameters set forth in the present application are approximations that can vary depending on the desired properties sought to be obtained by a person of ordinary skill in the art without undue experimentation using the teachings disclosed in the present application.

Embodiments

A. A low odor packaging film comprising an oriented film, the oriented film comprising:
  a) an inner layer comprising a multicomponent recyclate,
  b) a first odor barrier layer, and
  c) a second odor barrier layer, wherein the inner layer is between the first odor barrier layer and the second odor barrier layer.
B. A low odor packaging film according to any other low odor packaging film embodiment wherein the first odor barrier layer and the second odor barrier layer each comprise a material having an oxygen transmission rate (OTR) of less than 150 cm$^3$ 25 micron/m$^2$ day when tested at 23° C. and 50% Relative Humidity (RH).
C. A low odor packaging film according to any other low odor packaging film embodiment wherein the first odor barrier layer comprises at least one of a polyamide or an ethylene vinyl alcohol copolymer, and the second odor barrier layer comprises at least one of a polyamide or an ethylene vinyl alcohol copolymer.
D. A low odor packaging film according to any other low odor packaging film embodiment wherein the inner layer further comprises a compatibilizer.
E. A low odor packaging film according to any other low odor packaging film embodiment wherein the inner layer further comprises an odorous derivative of caprolactam.
F. A low odor packaging film according to any other low odor packaging film embodiment wherein the first and second odor barrier layers reduce the transmission of the odorous derivative of caprolactam from the inner layer such that the packaging film has a low odor profile.
G. A low odor packaging film according to any other low odor packaging film embodiment wherein the multicomponent recyclate comprises a polyamide and a polyolefin.
H. A low odor packaging film according to embodiment G wherein the polyolefin is a polyethylene or a polypropylene.
I. A low odor packaging film according to any other low odor packaging film embodiment wherein the multicomponent recyclate further comprises an ethylene vinyl alcohol copolymer.
J. A low odor packaging film according to any other low odor packaging film embodiment wherein the oriented film has been oriented by a factor of at least 2 in the machine direction.
K. A low odor packaging film according to any other low odor packaging film embodiment wherein the oriented film has a haze value at least 25% lower than a non-oriented film of the same composition and structure.
L. A low odor packaging film according to any other low odor packaging film embodiment wherein the oriented film has a gloss value greater than 60%.
M. A low odor packaging film comprising an oriented film, the oriented film comprising:
  a) a first odor barrier layer,
  b) an inner layer comprising a polyamide, a polyolefin and a compatibilizer, and
  c) a second odor barrier layer, wherein the inner layer is positioned between the first and second odor barrier layers.

N. A low odor packaging film according to embodiment M wherein the first odor barrier layer comprises a polyamide and the second odor barrier layer each comprise a polyamide.
O. A low odor packaging film according to embodiment M or N wherein the inner layer is directly adjacent to the first odor barrier layer and the second odor barrier layer is directly adjacent to the inner layer.
P. A low odor packaging film according to embodiment M, N or O further comprising:
  a) a first polymeric adhesive layer located between the first odor barrier layer and the inner layer, and
  b) a second polymeric adhesive layer located between the inner layer and the second odor barrier layer.
Q. A low odor packaging film according to any other low odor packaging film embodiment wherein the oriented film has been oriented by a factor of at least 2 in the machine direction.
R. A low odor packaging film according to any other low odor packaging film embodiment wherein the oriented film has a gloss value greater than 60%.
S. A method of producing low odor packaging film according to any low odor packaging film embodiment wherein the polyamide and the polyolefin of the inner layer are introduced as an unseparated multicomponent recyclate.
T. A low odor packaging film comprising an oriented film, the oriented film comprising:
  a) an inner layer comprising recycled polyamide,
  b) a first odor barrier layer, and
  c) a second odor barrier layer,
  wherein the inner layer is between the first and second odor barrier layers.

What is claimed:
1. A packaging film comprising an oriented film, the oriented film comprising:
  a) an inner layer comprising a multicomponent recyclate,
  b) a first odor barrier layer,
  c) a second odor barrier layer, the inner layer positioned between the first odor barrier layer and the second odor barrier layer, and,
  wherein the first odor barrier layer and the second odor barrier layer reduce the transmission of odorous compounds from the inner layer such that the packaging film is suitable for packaging organoleptically sensitive products, and
  the oriented film has a gloss value greater than 60%, as determined in accordance with ASTM D2457-90.
2. The packaging film according to claim 1, wherein the first odor barrier layer and the second odor barrier layer each have an oxygen transmission rate (OTR) of less than 150 cm3 25 micron/m2 day when tested at 23° C. and 50% Relative Humidity (RH).
3. The packaging film according to claim 1, wherein the first odor barrier layer comprises at least one of a polyamide or an ethylene vinyl alcohol copolymer, and the second odor barrier layer comprises at least one of a polyamide or an ethylene vinyl alcohol copolymer.
4. The packaging film according to claim 1, wherein the inner layer further comprises a compatibilizer.
5. The packaging film according to claim 1, wherein the inner layer further comprises an odorous derivative of caprolactam.
6. The packaging film according to claim 1, wherein the multicomponent recyclate comprises a polyamide and a polyolefin.

7. The packaging film according to claim 6, wherein the polyolefin is a polyethylene or a polypropylene.

8. The packaging film according to claim 7, wherein the multicomponent recyclate further comprises an ethylene vinyl alcohol copolymer.

9. The packaging film according to claim 1, wherein the oriented film has been oriented by a factor of at least 2 in the machine direction.

10. The packaging film according to claim 1, wherein the oriented film has a haze value as determined in accordance with ASTM D1003-92 of at least 25% lower than a non-oriented film of the same composition and structure.

11. A packaging film comprising an oriented film, the oriented film comprising:
    a) a first odor barrier layer,
        b) an inner layer comprising a polyamide, a polyolefin and a compatibilizer, and
    c) a second odor barrier layer, the inner layer is positioned between the first and second odor barrier layers, and
    wherein the first odor barrier layer and the second odor barrier layer each have an oxygen transmission rate (OTR) of less than 150 cm3 25 micron/m2 day when tested at 23° C. and 50% Relative Humidity (RH) to reduce the transmission of odorous compounds from the inner layer such that the packaging film is suitable for packaging organoleptically sensitive products, and the oriented film has a gloss value greater than 60%, as determined in accordance with ASTM D2457-90.

12. The packaging film according to claim 11, wherein the first odor barrier layer and the second odor barrier layer each comprise a polyamide.

13. The packaging film according to claim 11, wherein the inner layer is directly adjacent to the first odor barrier layer and the second odor barrier layer is directly adjacent to the inner layer.

14. The packaging film according to claim 11, further comprising:
    a) a first polymeric adhesive layer located between the first odor barrier layer and the inner layer, and
    b) a second polymeric adhesive layer located between the inner layer and the second odor barrier layer.

15. The packaging film according to claim 11, wherein the oriented film has been oriented by a factor of at least 2 in the machine direction.

16. A packaging film comprising an oriented film, the oriented film comprising:
    a) an inner layer comprising recycled polyamide,
  b) a first odor barrier layer, and
    c) a second odor barrier layer,
the inner layer positioned between the first and second odor barrier layers, and
    wherein the first odor barrier layer and the second odor barrier layer reduce the transmission of odorous compounds from the inner layer such that the packaging film is suitable for packaging organoleptically sensitive products, and
the oriented film has a gloss value greater than 60%, as determined in accordance with ASTM D2457-90.

\*   \*   \*   \*   \*